(12) United States Patent
Melcher

(10) Patent No.: US 7,644,571 B2
(45) Date of Patent: Jan. 12, 2010

(54) HOSE CONDUIT ELEMENT FOR A PAINT ROBOT

(75) Inventor: Rainer Melcher, Oberstenfeld (DE)

(73) Assignee: Durr Systems, Inc., Auburn Hills, MI (US)

( * ) Notice: Subject to any disclaimer, the term of this patent is extended or adjusted under 35 U.S.C. 154(b) by 659 days.

(21) Appl. No.: 11/402,679

(22) Filed: Apr. 12, 2006

(65) Prior Publication Data

US 2006/0272311 A1    Dec. 7, 2006

Related U.S. Application Data

(60) Provisional application No. 60/686,319, filed on Jun. 1, 2005.

(51) Int. Cl.
*F16L 3/14* (2006.01)

(52) U.S. Cl. ............................. 59/78.1; 59/900; 248/49; 248/51

(58) Field of Classification Search ................ 59/78.1, 59/900; 248/49, 51
See application file for complete search history.

(56) References Cited

U.S. PATENT DOCUMENTS

| 3,233,850 | A | * | 2/1966 | Merker et al. | 248/49 |
|---|---|---|---|---|---|
| 3,430,662 | A | * | 3/1969 | Guarnaschelli | 248/49 |
| 4,582,281 | A | * | 4/1986 | Van Camp | 248/51 |
| 4,840,023 | A | * | 6/1989 | Borsani | 59/78.1 |
| 5,824,957 | A | * | 10/1998 | Holshausen | 59/78.1 |
| 6,374,589 | B1 | * | 4/2002 | Kunert et al. | 59/78.1 |
| 7,484,351 | B2 | * | 2/2009 | Harada et al. | 59/78.1 |

* cited by examiner

*Primary Examiner*—David B Jones
(74) *Attorney, Agent, or Firm*—Rader Fishman & Grauer

(57) ABSTRACT

A hose guiding element for routing at least one hose in a hose passageway of a robot. The hose guiding element has a least one guide passage running axially to receive the hose to be routed. The element has particular use in a wrist axis of a painting robot.

22 Claims, 4 Drawing Sheets

HOSE CONDUIT ELEMENT FOR A PAINT ROBOT

CROSS-REFERENCE TO RELATED APPLICATIONS

This application claims priority to U.S. Provisional Patent Application Ser. No. 60/686,319 filed on Jun. 1, 2005, the entire contents of which is incorporated herein in its entirety.

FIELD OF THE INVENTION

The invention relates in general to a hose element for guiding a hose in a hose conduit of a robot.

DESCRIPTION OF THE RELATED ART

On modern painting robots with a highly flexible robot wrist axis several hoses have to be passed through the robot arm and the wrist axis. The individual hoses supply, for example, the coating material to be applied or drive air to drive an atomizer turbine. Two versions known for routing hoses in the robot wrist axis are briefly described in what follows.

In one version the robot wrist axis has rigid, mostly smoothly polished metal tubes, which may be straight or curved and which position the hoses. The transitions between the individual metal tubes should be as straight as possible or be made with the smallest possible changes in angle, avoiding tight radii or sharp-edged transitions in order to keep the mechanical loads on the hoses low when the wrist axis changes position.

In another version the hoses are routed in a flexible protective hose built into the wrist axis of the robot. The advantage of this version is the continuous shape of the passageway since the radii of the bends are generally larger than those of metal tubes. The protective hose is attached to the output flange of the wrist axis and turns along with the hose bundle. This protective hose is preferably driven with a rotary motion in the same direction at each end of its two sides to prevent greater mechanical torsional load. The synchronous rotation of the protective hose with the hoses running inside it advantageously prevents the hoses from rubbing on the inner wall of the protective hose. Instead, the hoses carried in the protective hose only have to withstand the relative motions caused by axial movements when the robot wrist axis changes position.

SUMMARY OF THE INVENTION

A disadvantage associated with each of these known versions of a hose conduit in a robot wrist axis is the fact that the hoses change their position in the hose conduit when the wrist axis bends or rotates. There is a danger that as the result of axial stretching and compression loops form in the conduit, potentially becoming pinched in the rest of the hose bundle, thus bending and wearing very quickly. Furthermore, the hoses can become twisted in different positions and then slide against each other under high pressure.

An object of the invention is therefore to suitably improve the hose conduit in a robot wrist axis. This object is achieved by means of a hose conduit, or guiding, element in accordance with the invention.

The invention disposes a special hose guiding element in the robot wrist axis, which element guides the hoses in the lateral direction and thereby prevents the formation of loops. The hose guiding element of the invention therefore has preferably at least one guide passage running axially to receive the hose to be routed, where the guide passage preferably goes completely through the hose guiding element in the axial direction. In one version of the invention the hose guiding element has several guide plates with a specified outside diameter located axially behind one another. In each of the several guide plates at least one guide passage is located for the hose to be routed, with the guide passages in the individual guide plates located in axial alignment. This offers the advantage that the hoses within the conduit are guided laterally not just at one point but preferably along the entire length of the conduit. Moreover, dividing the hose guiding element into several guide plates located axially one behind the other advantageously allows great bending flexibility in the hose guiding, which is particularly important in a robot wrist axis.

The individual guide plates of the hose guiding element in accordance with the invention can be mechanically connected to each other to prevent axial displacement of the individual guide plates in the assembled state.

Optionally, only the axially outward guide plates are mechanically connected to each other while the axially inward guide plates are mechanically separated from each other and are connected only by the hoses to be routed or by a surrounding protective hose.

A second possibility is that all the guide plates of the hose guiding element are mechanically connected to each other.

Attachment of the individual guide plates to each other is preferably carried out by means of a centrally located elastic inner tensioning core. The central arrangement of the mechanical connection of the guide plates advantageously makes possible great bending compliance, which is particularly important in a highly flexible robot wrist axis. Furthermore, the inner tensioning core is preferably flexible in the axial direction as well in order to be able to accommodate reciprocating motion when the robot wrist axis changes position.

An alternative possibility also exists that all the guide plates are mechanically separated from one another and are connected to each other only by means of the hoses being carried or by a surrounding protective hose.

In another version of the invention the hoses are routed by a spiral circumferential guide lip in which the axially continuous guide passage is located.

It is advantageous if the individual guide plates or the individual spiral threads of the spiral guide lip taper in the radially outward direction. In this way adjacent guide plates or adjacent spiral threads of the spiral guide lip are prevented from striking each other prematurely when the hose guiding element in accordance with the invention bends, thereby restricting its freedom of movement.

For the same purpose, a groove with a specified groove width is preferably located between the individual guide plates or between the adjacent spiral threads of the spiral guide lip. The groove width is preferably between 5% and 30% of the outside diameter of the hose guiding element.

It should be further mentioned that the guide passage in the hose guiding element in accordance with the invention is preferably oversized compared with the hose to be routed so that the hose being routed can slide axially in the guide passage. This prevents the hose being routed from jamming in the hose guiding element in accordance with the invention, since such jamming could result in undesirable mechanical stresses.

Further, at the oppositely located ends of the hose guiding element in accordance with the invention preferably two attaching flanges are mounted, locked against rotation, so that the hose guiding element of the invention with the hose bundle routed therein rotates with the wrist axis when the wrist axis rotates. This prevents the hoses from rubbing on the inside wall of the hose passageway.

In a preferred embodiment of the invention, the hose guiding element has a plurality of guide passages distributed over the cross-section of the hose guiding element. The individual guide passages may have different cross-sections, with the larger guide passages for the thick and inflexible hoses being preferably located toward the interior of the hose guiding element, while the smaller guide passages for the thin and thus flexible hoses are preferably located toward the exterior of the hose guiding element. This arrangement is advantageous because the mechanical load in what is called the neutral fiber in the center is lower.

In addition, the hose guiding element in accordance with the invention preferably has a specified bending elasticity and/or a specified tensile elasticity so that the hose guiding element can adapt accordingly to a change in the position of the robot.

The guide plates, the spiral guide lip, the attaching flanges and/or the inner tensioning core preferably comprise polyurethane. It is particularly advantageous if the inner tensioning core consists of a softer material than the guide plates, the spiral guide lip and/or the attaching flanges.

The inner tensioning core can be configured as a separate component bonded to the guide plates, the spiral guide lip and/or the attaching flanges. However, an alternative possibility is also to produce the hose guide element of the invention with the inner tensioning core, the guide plates, or the spiral guide lip, and the attaching flanges in one piece.

It should be mentioned further that the invention is not restricted to the previously described hose guiding element in accordance with the invention as a single component, but it also includes a hose conduit with a protective hose and a hose guiding element in accordance with the invention located therein. In this, the hose guiding element may be coated on the surfaces contacting the surrounding protective hose with a lubricant, such as Vaseline® petroleum jelly, to reduce friction and thus wear. The protective hose moreover is preferably oversize compared with the hose guiding element located inside, which further reduces friction and therefore wear.

The invention further includes a complete robot wrist axis with a hose guide of this type and a complete painting robot having such a wrist axis.

It should be further mentioned that the concept of a hose used in the scope of the invention is not restricted to hoses in the narrower sense of the word that carry a fluid. Rather within the scope of the invention the concept includes electrical cable, wires, fiber optic cables and the like.

Other advantageous embodiments of the invention are described in the dependent claims or are explained in what follows together with the description of the preferred embodiments with reference to the drawings.

BRIEF DESCRIPTION OF THE DRAWING

The description herein makes reference to the accompanying drawing wherein like reference numerals refer to like parts throughout the several views, and wherein.

DETAILED DESCRIPTION

Figure 1:
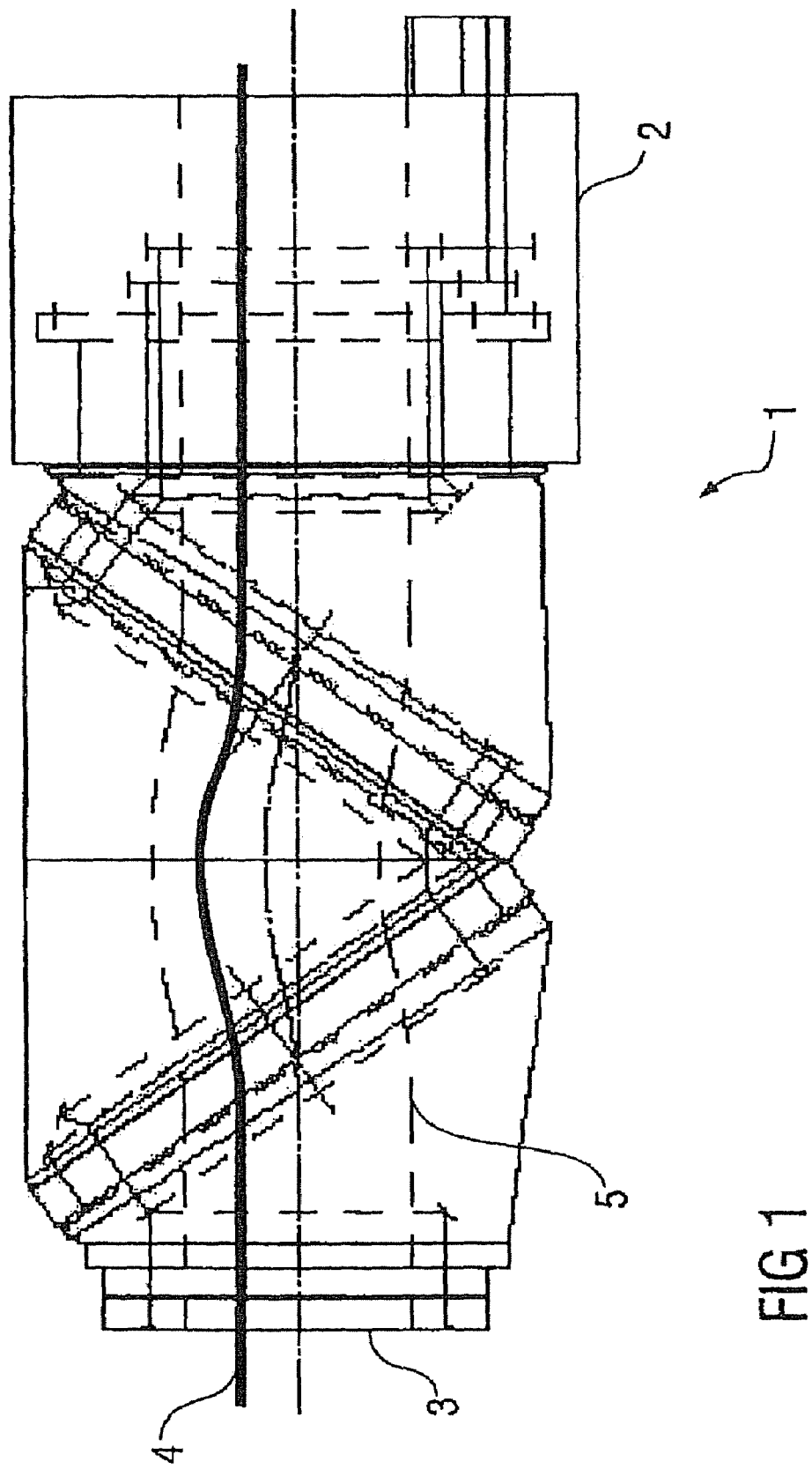
FIG. 1 shows a side elevation of a robot wrist axis of a painting robot without a hose guiding element in accordance with the invention.
Figure 2:
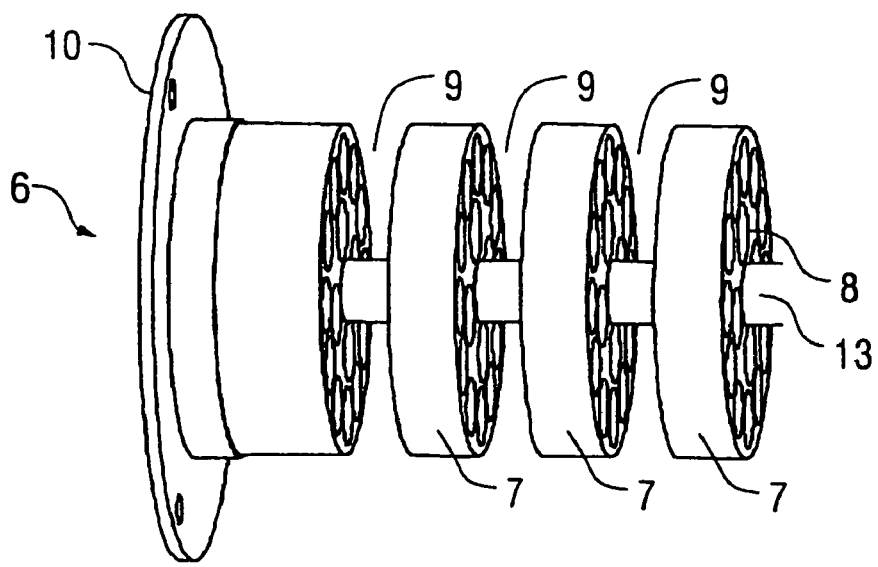
FIG. 2 shows a perspective view of one part of a hose guiding element in accordance with the invention.

The side elevation in FIG. 1 shows a largely conventionally constructed robot wrist axis 1 of a painting robot. The robot wrist axis 1 is attached to a robot arm 2 of the painting robot and has an attaching flange 3 at its distal end to which, for example, a rotary atomizer can be attached.

Several hoses run through the robot wrist axis 1, with only a single hose 4 shown for the sake of simplicity. The hoses running through the robot wrist axis 1 carry, for example, coating agents or air to drive the rotary atomizer turbine. The hose 4 runs in a passageway 5 inside the wrist axis 1, where the routing of the hose 4 within the passageway 5 can be effected by a hose guiding element 6, as shown in FIGS. 2-5 or in FIGS. 6 and 7 and described in what follows.

The hose guiding element 6 has numerous disc-shaped guide plates 7, axially separated and located behind one another. Several guide passages 8 are distributed over the cross-section in which the hose 4, or the additional hoses not shown, run in the assembled state.

Figure 3:
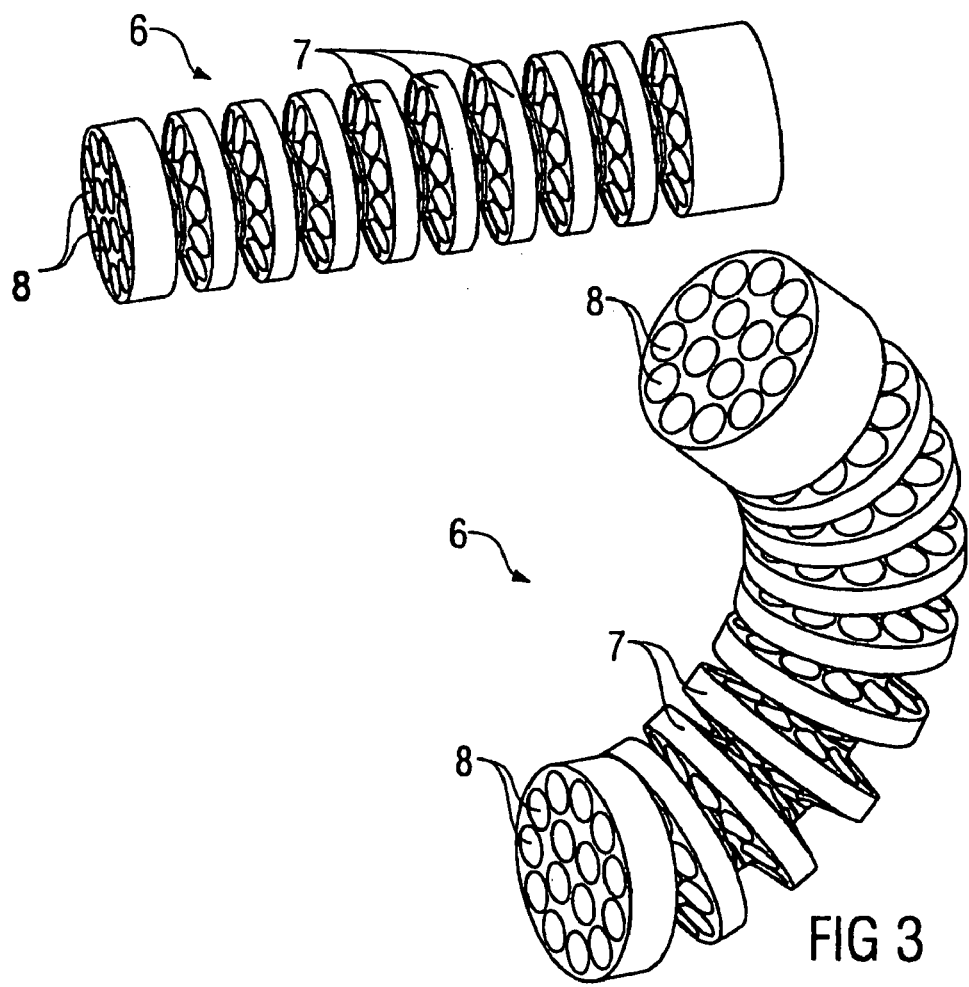
FIG. 3 shows perspective views of one part of a conduit guide element in accordance with the invention.
Figure 4:
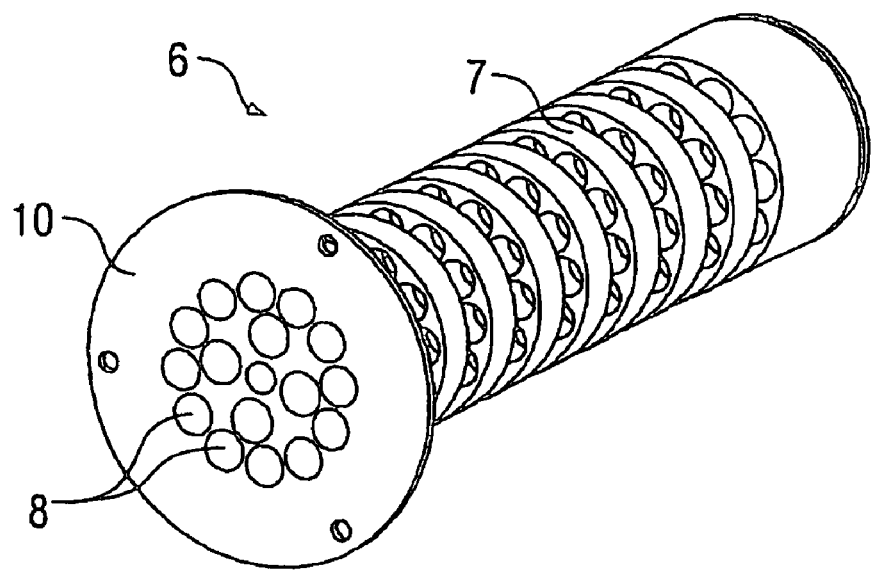
FIG. 4 shows a further perspective view of a hose guiding element in accordance with the invention.
Figure 5:
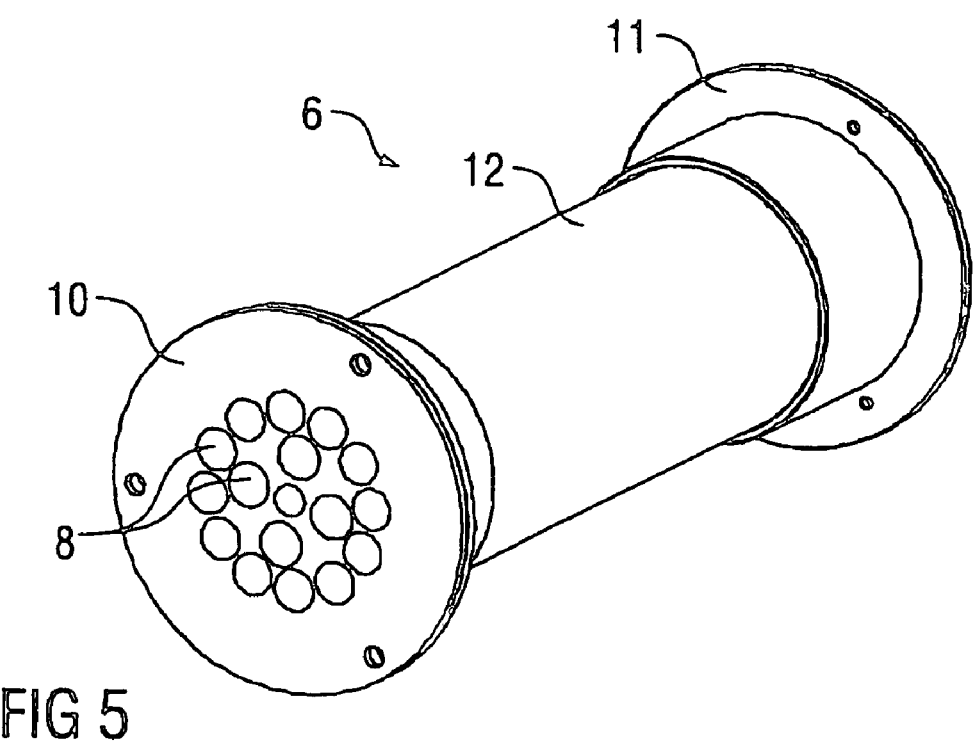
FIG. 5 shows the hose guiding element from FIG. 4 installed in a protective hose.

Between the individual guide plates 7 there is a groove 9 to prevent the individual guide plates 7 from colliding at their peripheral edge when the wrist axis 1 bends and thereby restricting the freedom of motion of the robot wrist axis 1. For the same reason, the individual guide plates 7 preferably taper in an outward radial direction as shown in FIG. 3. The individual guide plates 7 are preferably connected to each other by an elastic inner tensioning core 13, which is elastic both in flexure and in tension.

At its two oppositely located ends the hose guiding element 6 has an attaching flange 10, 11. The two attaching flanges 10, 11 are mounted, locked against rotation, to a protective hose 12 that encloses the hose guiding element 6.

The individual guide plates 7, the attaching flanges 10, 11 and the inner tensioning core 13 consist of a polyurethane, with the inner tensioning core 13 consisting of a softer material than the guide plates 7 and the attaching flanges 10, 11.

It should be mentioned in addition that a lubricant such as Vaseline® petroleum jelly is applied to the peripheral surface area of the individual guide plates 7 in order to reduce wear-promoting friction between the guide plates and the inner wall of the protective hose 12. The protective hose 12 is preferably oversized compared with the guide plates 7, which similarly reduces friction and thus wear.

The guide passages 8 in the individual guide plates 7 are also oversized compared with the hoses to be routed in order to prevent the hoses being routed from jamming in the guide plates 7 since this could result in disruptive mechanical stresses.

Figure 6:
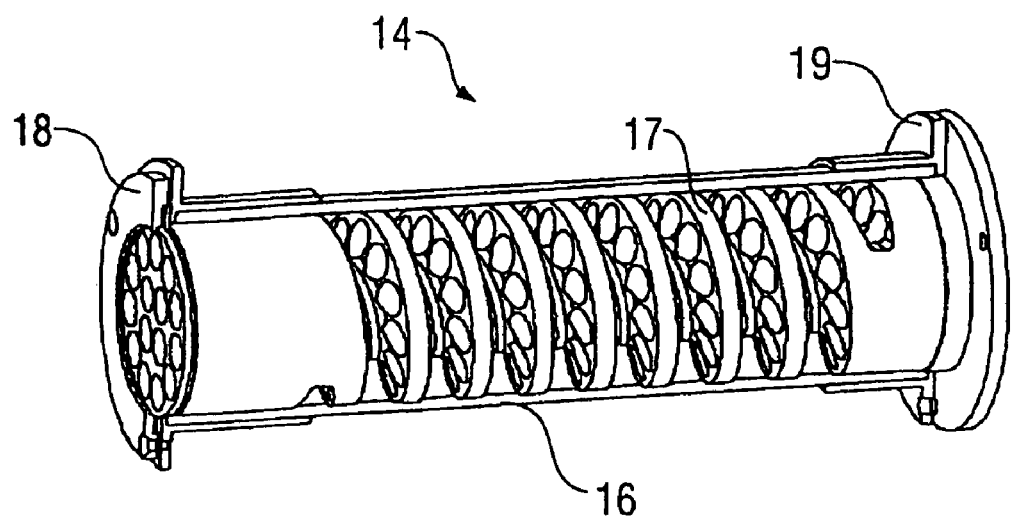
FIG. 6 shows a cross-section of an alternate embodiment of a hose conduit with a protective hose and a hose guiding element located therein with a spiral circumferential guide lip.
Figure 7:
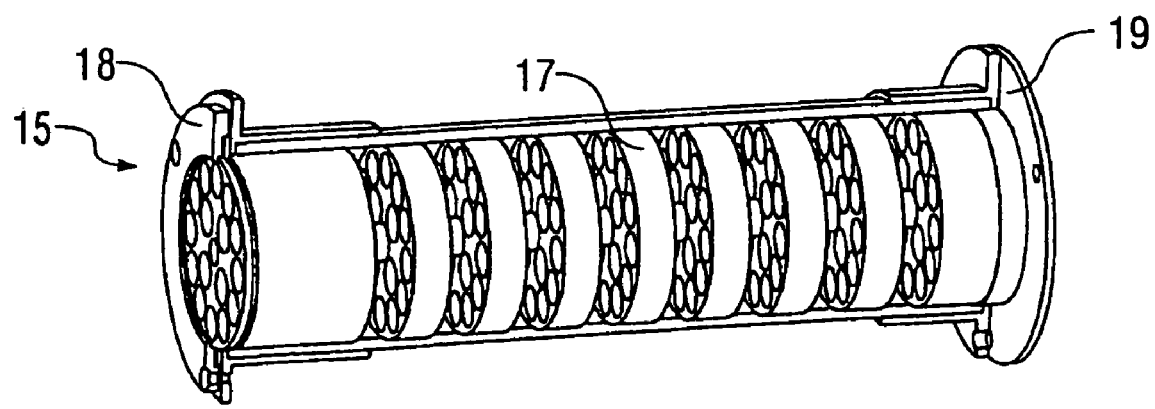
FIG. 7 shows a perspective view of the hose guiding element from FIG. 6.

FIGS. 6 and 7 show a further embodiment of a hose conduit 14 in accordance with the invention. In this embodiment, a hose guiding element 15 is located in a protective hose 16. The hose guiding element 15 here has a spiral circumferential guide lip 17, with axially aligned guide passages located in the individual spiral threads of the guide lip 17. Each of the axially aligned guide passages locates a hose, such as hose 4, and guides it in the lateral direction. At its oppositely located ends, the hose guiding element 15, together with the protective hose 16, is connected to two attaching flanges 18, 19 and locked against rotation. The hose guiding element 15 here also consists of a polyurethane, wherein a groove remains open between the adjacent spiral guide lip 17, which allows bending compliance for the hose guide element 15.

The invention is not restricted to the previously described preferred embodiments. Rather a plurality of variations and alterations are possible that also make use of the inventive idea and therefore fall under its protection.

What is claimed is:

1. A hose guiding element for guiding at least one hose in a hose passageway of a robot, comprising:
   at least one axially running guide passage, each guide passage formed to receive a respective hose to be routed;
   a plurality of guide plates located axially one behind the other and having a specified outside diameter, each guide passage axially aligned through the guide plates; and
   a centrally located elastic tensioning core extending through the several guide plates and connecting the several guide plates with each other;
   wherein the elastic tensioning core is substantially the sole connection between the guide plates.

2. The hose guiding element according to claim 1, further comprising: several guide plates located axially one behind the other and having a specified outside diameter, each guide passage axially aligned through the several guide plates.

3. The hose guiding element according to claim 2 wherein each of the several guide plates are one of mechanically connected to each other and mechanically separated from each other.

4. The hose guiding element according to claim 3, further comprising:
   the centrally located elastic tensioning core extending through the several guide plates and solely connecting the several guide plates mechanically with each other.

5. The hose guiding element according to claim 2 wherein the several guide plates comprise at least two axially outward lying guide plates mechanically connected to each other and at least two axially inward lying guide plates mechanically separated from each other, wherein the two axially inward lying guide plates are between the two axially outward lying guide plates.

6. The hose guiding element according to claim 2 wherein each of the several guide plates taper in an outward radial direction.

7. The hose guiding element according to claim 2 wherein the each of the several guide plates are separated from each other by a groove having a specified groove width.

8. The hose guiding element according to claim 7 wherein the groove width is between 5% and 30% of the outside diameter of the several guide plates.

9. A hose guiding element for guiding at least one hose in a hose passageway of a robot, comprising:
   at least one axially running guide passage, each guide passage formed to receive a respective hose to be routed; and
   a spiral guide lip running circumferentially about the at least one axially running guide passage; and wherein each guide passage passes axially through the spiral guide lip.

10. The hose guiding element according to claim 9 wherein individual spiral threads of the spiral guide lip taper in the outward radial direction.

11. The hose guiding element according to claim 9 wherein individual spiral threads of the spiral guide lip are separated from each other by a groove with a specified groove width.

12. The hose guiding element according to claim 11 wherein the groove width is between 5% and 30% of the outside diameter of the spiral guide lip.

13. The hose guiding element according to claim 1, further comprising: two attaching flanges mounted at oppositely located ends of the at least one axially running guide passage, the two attaching flanges locked against rotation with respect to each other.

14. The hose guiding element according to claim 1 wherein the at least one axially running guide passage comprises a plurality of guide passages, at least one of the plurality of guide passages located at a central area of the hose guiding element and having a first cross-section suitable for a thick hose and others of the plurality of guide passages located outside of the central area and having a second cross-section suitable for a thin hose.

15. The hose guiding element according to claim 1 wherein the hose guiding element has at least one of bending elasticity and tensile elasticity.

16. The hose guiding element according to claim 1, further comprising: several guide plates located axially one behind the other, each guide passage axially aligned through the several guide plates; and a centrally located tensioning core extending through the several guide plates and connecting at least two of the several guide plates mechanically with each other wherein the inner tensioning core is of a softer material than the several guide plates.

17. The hose guiding element according to claim 16 wherein at least one of tensioning core and the several guide plates comprise a polyurethane material.

18. A hose conduit, comprising;
   a hose guiding element for guiding at least one hose in a hose passageway of a robot, including at least one axially running guide passage, each guide passage formed to receive a respective hose to be routed; and
   a protective hose surrounding the hose guiding element.

19. The hose conduit according to claim 18, further comprising a lubricant applied to the hose guiding element at contact surfaces with the protective hose.

20. A robot wrist axis comprising a hose conduit according to claim 18.

21. A painting robot having a robot wrist axis according to claim 20 and an attaching flange securing the robot wrist axis.

22. A method of routing at least one hose in a painting robot, comprising: inserting a first hose to be routed through a first axially running guide passage; inserting a second hose to be routed through a second axially running guide passage; and placing a protective hose around the first axially running guide passage and the second axially running guide passage.

* * * * *